(12) United States Patent
Schmidt et al.

(10) Patent No.: US 9,744,846 B2
(45) Date of Patent: Aug. 29, 2017

(54) ROLLER BLIND MODULE FOR A COOLING MODULE OF A VEHICLE AND FRONT END ELEMENT FOR A VEHICLE

(71) Applicants: HBPO GmbH, Lippstadt (DE); Audi AG, Ingolstadt (DE)

(72) Inventors: Ralf Schmidt, Oelde (DE); Reinhold Brückner, Herzebrock-Clarholz (DE); Jörg-Walter Rau, Ingolstadt (DE)

(73) Assignees: HBPO GmbH, Lippstadt (DE); Audi AG, Ingolstadt (DE)

( * ) Notice: Subject to any disclaimer, the term of this patent is extended or adjusted under 35 U.S.C. 154(b) by 0 days.

(21) Appl. No.: 14/433,678

(22) PCT Filed: Oct. 2, 2013

(86) PCT No.: PCT/EP2013/070580
§ 371 (c)(1),
(2) Date: Apr. 6, 2015

(87) PCT Pub. No.: WO2014/053567
PCT Pub. Date: Apr. 10, 2014

(65) Prior Publication Data
US 2015/0246608 A1    Sep. 3, 2015

(30) Foreign Application Priority Data
Oct. 5, 2012  (DE) .................. 10 2012 109 503

(51) Int. Cl.
*B01D 45/10*  (2006.01)
*B60K 11/08*  (2006.01)
*B60K 11/04*  (2006.01)

(52) U.S. Cl.
CPC ............ *B60K 11/085* (2013.01); *B60K 11/04* (2013.01)

(58) Field of Classification Search
CPC ...... B60K 11/04; B60K 11/085; B01D 46/18; B01D 46/185; B01D 46/20; B01D 45/22
(Continued)

(56) References Cited

U.S. PATENT DOCUMENTS 2,236,986 A * 4/1941 Beeman .................... F01P 7/10
160/11
3,717,978 A * 2/1973 Osborne ................ B01D 46/18
55/289

(Continued)

FOREIGN PATENT DOCUMENTS

CH           205734       6/1939
DE       102006042627    3/2008
(Continued)

OTHER PUBLICATIONS

International Search Report and the Written Opinion Dated Dec. 18, 2013 From the European Patent Office Re. Application No. PCT/EP2013/070580 and Translation of Search Report in English.

*Primary Examiner* — Katherine Mitchell
*Assistant Examiner* — Abe Massad

(57) ABSTRACT

The invention related to a roller blind module (1) for a cooling module (2) of a vehicle wherein the roller blind module (1) is assembled at the cooling module (2) comprising a roller blind element (10), at least a drive (15), by which the roller blind element (10) is uncoilable from a first position (11) in at least a second position (12) wherein in the first position (11) the roller blind element (10) is wound up and in the second position (12) the roller blind element is assembled in front of the cooling module (2) regarding to the driving direction (30) of the vehicle, and a cleaning device (20) with at least one cleaning element (21) wherein the roller blind element (10) is cleanable by the cleaning element (21).

20 Claims, 3 Drawing Sheets

(58) Field of Classification Search
USPC .................................................. 356/237.3
See application file for complete search history.

(56) References Cited

U.S. PATENT DOCUMENTS

| | | | | |
|---|---|---|---|---|
| 3,757,493 A * | 9/1973 | Johnston | ................ | B01D 46/18 55/290 |
| 4,125,147 A * | 11/1978 | Bailey | .................... | B60K 11/04 165/95 |
| 4,294,596 A * | 10/1981 | Taverez | ................ | B01D 46/22 180/301 |
| 7,898,654 B2 * | 3/2011 | Saitoh | .................... | G01N 21/85 356/237.1 |
| 2006/0211364 A1 * | 9/2006 | Brotz | .................... | B60K 11/08 454/261 |
| 2011/0120066 A1 * | 5/2011 | Sakashita | ........... | B01D 46/0065 55/282.2 |

FOREIGN PATENT DOCUMENTS

| | | |
|---|---|---|
| GB | 962336 | 7/1964 |
| GB | 2479044 | 9/2011 |
| JP | 11051595 A * | 2/1999 |
| WO | WO 2014/053567 | 4/2014 |

\* cited by examiner

ROLLER BLIND MODULE FOR A COOLING MODULE OF A VEHICLE AND FRONT END ELEMENT FOR A VEHICLE

RELATED APPLICATIONS

This application is a National Phase of PCT Patent Application No. PCT/EP2013/070580 having International filing date of Oct. 2, 2013, which claims the benefit of priority of German Patent Application No. 10 2012 109 503.5 filed on Oct. 5, 2012. The contents of the above applications are all incorporated by reference as if fully set forth herein in their entirety.

FIELD AND BACKGROUND OF THE INVENTION

The invention relates to a roller blind module for a cooling module of a vehicle wherein the roller blind module is assembled at the cooling module, comprising a roller blind element and at least a drive, by which the roller blind element is uncoilable from a first position into at least a second position wherein in the first position the roller blind element is wound up and in the second position the roller blind element is assembled in front of the cooling module respective to the driving direction of the vehicle. Moreover, the invention relates to a front end element for a vehicle at least comprising a cross member, a cooling module, which is assembled at the cross member, and a roller blind module for the cooling module.

In recent vehicles, particularly in motor vehicles, streaming in fresh air is channelized by a radiator grill of the vehicle or by the opening of the radiator grill and is guided to a cooling module of the vehicle. Particularly by this targeted channelized guiding of the airstream to the cooling module it can be ensured that the corresponding embodiment of the cooling module, for example a motor of a vehicle and/or charge air for this motor, are efficiently cooled and/or the vehicle interior is efficiently conditioned.

The cooling module is exposed to the air stream during the operation of the vehicle. Thereby, however, also a contamination of the cooling module can be involved. Thereby, the functionality of the cooling module is affected. For example a contamination of the cooling module with sand, dust, mud or other types of dirt can lead to a reduction of the cooling capacity of the cooling module. Also a direct damage of the cooling module, particularly for example by rock fall, is possible. Likewise, a control of the amount of the towards the cooling module streaming air can be advantageous. So for example for reasons of the reduction of the $CO_2$ emission particularly with motor vehicles systems can be applied, which realize a control of the cooling air admission. These systems can thereby for example reduce the cold running period of the motor of the vehicle and ensure a faster achievement of the operating temperature of the motor of the vehicle.

It is known in such systems for controlling the cool air entry to apply flap systems. These flap systems however possess depending on the flap height in the opened state a considerable space requirement in longitudinal direction of the vehicle. Further, the air stream is deflected by the flaps in the open state depending on the opening angle of the flaps in different angles and thereby cannot be efficiently used at any time.

In order to avoid these disadvantageous characteristics of flap systems, it can be an advantage to replace the flap system by a roller blind module. So it is for example known from a not yet published application of the applicant to assemble such roller blind modules directly behind the radiator grill of the vehicle. The roller blind module particularly possesses the advantage compared to the flap system as it comprises only a small space requirement in longitudinal direction of the vehicle. By this assembly directly behind the cooling grids another advantage arises additional to the controlling of the air stream that with a closed roller blind module the air resistance of the vehicle is reduced. By the assembly directly behind the cooling grids it however results at the same time that the roller blind module is spaced apart from the cooling module of the vehicle. Thereby in this interspace penetrating dirt can contaminate the cooling module and also damage it in the worst case.

SUMMARY OF THE INVENTION

It is the object of the present invention to resolve the previously described disadvantages of known air control systems. Particularly it is the object of the invention to generate a roller blind module for a cooling module of a vehicle and a front end module of a vehicle by which in a simple and cost efficient manner a particularly simple control of the air stream to the cooling module of the vehicle and at the same time a protection of the cooling module from contamination and damage can be achieved.

The previous object is solved by a roller blind module for a cooling module of a vehicle with the features of the independent claim 1 and by a front end element for a vehicle with the features of the independent claim 18. Further features and details of the invention arise from the dependent claims, the description and the drawings. Thereby features and details, which are described in connection with the roller blind module according to the invention apply naturally also in connection with the front end module according to the invention and vice versa so that regarding the disclosure of the single aspects of the invention it can be always mutually referred to.

According to a first aspect of the invention the object is solved by a roller blind module for a cooling module of a vehicle wherein the roller blind module is assembled at the cooling module comprising a roller blind element, at least a drive by which the roller blind element is uncoilable from a first position in at least a second position wherein in the first position the roller blind element is wound up and in the second position the roller blind element is assembled in front of the cooling module regarding the driving direction of the vehicle and a cleaning device with at least a cleaning element wherein by the cleaning element the roller blind element is cleanable.

The roller module according to the invention is assembled directly at the cooling module. Particularly, the roller blind element is in its first position wound up on a wrap-around roller. Particularly, the roller blind element of the roller blind is at least in a second position concerning the driving direction of the vehicle assembled in front of the cooling module wherein the distance between the roller blind element and the cooling module is small, particularly smaller than 20 mm. By this direct assembly on the one hand an improved control of the airstream to the cooling module of the vehicle is possible. Always only a part of the cooling module is reached by the airstream, which is released by the roller blind element of the roller blind module in its second position. Naturally, thereby multiple second positions are possible, which comprise a diverse overlap grade concerning the cooling module of the vehicle. Particularly also a second position be can naturally intended, in which the cooling module is completely covered concerning the air stream. The roller blind element can extend in its at least one second position thereby, respective to the assembly of the roller blind module at the cooling module, horizontally, vertically or in another optional direction in front of the cooling module. Naturally also multiple roller blind modules can be intended at the cooling module. Another advantage of a direct assembly of the roller blind module at the cooling module is an improved protection of the cooling module from dirt. Dirt concerning the invention can thereby be for example dust, sand, mud, crushed stone, water, snow, ice and also insects. By such dirt the module at the vehicle can be affected in its cooling capacity or in the worst case can also be damaged. By the cover of the cooling module by the roller blind element of the roller blind module the cooling module is thereby reliably and safely protected from dirt impact. Thereby it can occur that the dirt accumulates at the roller blind element. Particularly it can be intended that the roller blind module comprises a cleaning device with at least one cleaning element wherein by the cleaning element the roller blind element is cleanable. Thereby it is possible to remove the settled dirt on the roller blind element. An impairment of the function of the roller blind element of the roller blind module by dirt on the roller blind element can thereby be safely avoided. By particularly regular cleaning of the roller blind element by the cleaning element of the cleaning device a functionality of the roller blind module can be ensured at any time. This represents a particularly low maintenance embodiment of the roller blind module according to the invention for a cooling module of a vehicle.

Moreover, it can be intended that the roller blind module according to the invention is a support element, which supports the roller blind element in the at least one second position. By the flown against airstream it can occur that the roller blind element of the roller blind module is exposed to a high pressure load. By a support element this pressure load can be compensated. Particularly therefore the support element can be shaped grid-like in order to not unnecessarily constrain the airstream in not from the roller blind element covered sections of the cooling module. Moreover it can be advantageously intended that the edges of the support element are rounded down, whereby a damage of the roller blind element, which is pushed to the support element by the air stream, is avoided. Altogether by the support of the roller blind element by the support element the roller blind element itself can be performed from a correspondingly less stable material. Thereby a weight saving can occur.

Moreover, the roller blind module according to the invention can be performed in a way that at least one guidance element is intended, through which the roller blind element is led during the uncoiling from the first in the at least one second position. Particularly it can be advantageously intended that two guidance elements are intended, by which the roller blind element is guided on both sides longitudinally to the uncoiling direction of the roller blind element.

Thereby the lateral edges of the roller blind element are securely guided at any time whereby a flutter of these edges, which can particularly occur by a great force of the streaming air stream, can be prevented. The covered area of the cooling module by the roller blind element is thereby exactly determined at any time. Further, by such guidance elements a tilting of the roller blind element during the adjustment of the roller blind element is avoided. Further, thereby a particularly failure-free operation of the roller blind module according to the invention is ensured.

Particularly preferred it can be intended with the roller blind module according to the invention that the drive is a belt drive. With such a belt drive it is possible to drive a wrap-around roller, on which the roller blind element of the roller blind module is wound up, and affect at the edge of the roller blind element, which by a movement of the roller blind element moves from its first in its at least one second position via the cooling module at the same time. By this multiple power transmission to the roller blind element a particularly simple and secure adjustment of the roller blind element can be ensured by a drive shaped as a belt drive. Complex constructions for adjusting the roller blind element are not necessary for example via straps or similar.

According to a preferred enhancement of the roller blind module according to the invention it can be intended that the roller blind element is connected with the belt drive by at least a clamping element. By such a clamping element a secure connection between the roller blind element and the belt drive is ensured. It can thereby be particularly preferred that the belt drive comprises a drive belt and that the clamping element connects the roller blind element with this drive belt. Particularly preferred it is intended that such a drive belt on both sides of the roller drive element parallel to the uncoiling device wherein the roller blind element is connected with each of the drive belts by at least a clamping element. Naturally, also a continuous clamping element is possible that in this case can build an end strip of the roller blind element at the same time. Clamping elements are providing thereby a particularly simple manner to connect the roller blind element with the belt drive, so that no further connecting elements are necessary like for example screws or rivets.

Moreover, it can be intended with a roller blind module according to the invention that the cleaning element is shaped as a dirt repellent surface of the roller blind element. Therefore for example the surface of the roller blind element is performed in a way that a so called lotus effect appears. Dirt thereby does not or only hardly adhere to the surface of the roller blind element or is easily rinsed by water from the surface of the roller blind element. In this way all the time a dirt-free or at least hardly dirty surface of the roller blind element is ensured.

Alternatively or additionally it can be intended with a roller blind module according to the invention that the cleaning element comprises a stiffener, particularly a bristle element. By such a stiffener, which particularly extends over the complete width of the roller blind element, dirt can be stiffened from the roller blind element by a movement of the roller blind element. Since in operation of the roller blind module according to the invention the roller blind element is adjusted between different positions of the roller blind element, thereby a dirt-free surface of the roller blind element can be ensured. A bristle element thereby comprises a stiffener, which particularly is more flexible as a massive inflexible stiff stiffener. Thereby by the stiffener, which is performed as a bristle element the roller blind element can be preserved during cleaning.

Further, with the roller blind module according to the invention it is additionally or alternatively possible that the cleaning element comprises a device for cleaning the roller blind element with a liquid. Such a device can for example be one or multiple nozzles. With such a liquid dirt can be rinsed from the roller blind element. Thereby also an elimination of adhered or dried dirt on the roller blind element is particularly possible. As liquid particularly water preferably water with cleaning additives can be used. Likewise with such an embodiment of the cleaning element a dirt-free surface of the roller blind element of the roller blind module according to the invention can be ensured.

Further, a roller blind module according to the invention can be alternatively or additionally be developed that the cleaning element comprises a device for cleaning the roller blind element by vibration. By the device for cleaning the roller blind element by vibration the roller blind element is specifically set into vibration. Thereby the connection of the dirt to the roller blind element is dissolved, whereby the dirt lapses. It can thereby be intended that the whole roller blind element is set into vibration or only parts of the roller blind element are locally set into vibration. If, for example, in the roller blind module deflection rollers are intended, these can be set into vibration whereby such vibration is locally transferred to the roller blind element. The deflection rollers thereby particularly are a preferred place for these vibrations, since by the change of direction the rolling movement of the roller blind element automatically reduces the adhesion of particularly extensive dirt. Also by a vibration device a dirt-free surface of the roller blind element can be achieved.

Moreover it can be intended with the roller blind module according to the invention that the cleaning device is performed for cleaning the cleaning element particularly by a liquid and/or by vibration. The cleaning element intended for cleaning the roller blind element can naturally also itself be contaminated. In the contaminated state such a cleaning element can no longer ensure a secure and complete cleaning of the roller blind element. Further, by a contaminated cleaning element even dirt can be transferred to the roller blind element. Thereby in this case also cleaning of the cleaning element is necessary. Thereby that the cleaning device can also be performed for cleaning the cleaning element, each time a secure functionality of the cleaning element and thereby a securing of a dirt-free surface of the roller blind element is ensured. The advantages of a liquid cleaning and/or a vibration cleaning like previously described for the cleaning element regarding the cleaning of the roller blind element naturally also apply for the cleaning of the cleaning element itself.

Particularly preferred it can be intended for the roller blind module according to the invention that at least a deflection roller is intended by which the coiling and uncoiling direction of the roller blind element is alterable. Thereby by the presence of at least one deflection roller a wrap-around roller of the roller blind element, on which the roller blind element is wound up in its first position, is no longer assembled in a way that the roller blind element can be rolled from its first in its at least one second position. Thereby an increased freedom of placement results, the wrap-around roller can for example be assembled above the cooling module.

Thereby an unnecessary space requirement of the roller blind module in the driving direction of the vehicle can be avoided. Naturally, also multiple deflection rollers are possible. The deflection rollers can thereby be stationary or jointly rotating. Also an assembly of the deflection rollers in or at the housing of the roller blind module is possible. By such deflection rollers multiple design and placement variations of a roller blind module according to the invention are realizable.

According to an enhancement of the roller blind module according to the invention it can be intended that the roller blind element can be tensioned by the at least one deflection roller. For such a tension functionality, for example spring-biased elements and/or active readjusting elements like for example electric motors are intended. A crumpling or wave action of the roller blind element and a thereby connected danger of a tilting of the roller blind element can be avoided. Thereby a secure functionality of the roller blind element and thereby of the roller blind module according to the invention is ensured at any time.

Particularly it can be intended in an embodiment of the invention that a cleaning element is assembled at a deflection roller. This represents a particularly space saving assembly of the cleaning element. The roller blind element bypasses the deflection roller during the coiling and uncoiling. At the roller blind element adhesive dirt thereby inevitably passes the deflection roller and thereby also the at least one cleaning element assembled at the deflection roller. A secure cleaning of the roller blind element by the cleaning element can thereby be ensured in a particularly simple manner. Thereby for example the cleaning element can be a deflector, a bristle, a cleaning nozzle for a water purification or a vibration of the deflection roller. Naturally, also other embodiments of the cleaning element are possible.

Moreover, in an embodiment the roller blind module according to the invention can be performed in a way that the at least one deflection roller is pivotably mounted wherein the turning of the at least one deflection roller is restricted in a way that the roller element is only cleanable in one rolling direction of the roller blind element by the cleaning element. Since the roller blind element passes the deflection roller in the coiling and also in the uncoiling direction, it is sufficient that the roller blind element also is cleaned in one direction. Thereby on the one hand energy and cleaning liquid can be saved. On the other hand a possible interference of the turning movement, which can appear during the cleaning of the roller blind element, is only present in this one direction. A movement in the other rolling direction in which the roller blind element is not cleaned can occur unhindered. Also thereby for example the energy requirement of the drive is reduced.

Particularly preferred it can be intended in an embodiment of the roller blind module according to the invention that the turning of the at least one deflection roller is restricted by a stop and/or the one rolling direction, in which the roller blind element is cleanable, is the coiling direction. Dirt will particularly only reach the roller blind element if this is in its at least one second position. Thus it is reasonable to clean the roller blind element only in its coiling direction. Thereby it can be ensured that the roller blind element is always wound up clean, whereby a damage of the roller blind element by wound up dirt can be avoided. Thereby it can be an advantage that at least one deflection roller is pivotably developed and its turning is limited by at least one stop. Stops are thereby are particularly simple possibility to restrict a movement, particularly a turning of the deflection roller. The stop or stops can thereby be performed in a way that the movement of the roller blind element turns the deflection roller during uncoiling of the roller blind element so far that the cleaning element, which particularly for example is performed as a bristle element can no longer in a cleaning position rest at the roller blind element. In the opposite direction of the coiling direction the stop can be performed in a way that just in this case the turning of the deflection roller occurs up to a point, in which the cleaning element rests at the roller blind element in a way that its cleaning function can be developed to the full extend. Thereby, on the one hand a secure and simple uncoiling of the roller blind element and on the other hand a cleaning of the roller blind element during coiling of the roller blind element is ensured.

Further, a roller blind module according to the invention can be performed in a way that at least one particularly optic sensor unit for the registration of contamination in front of and/or on the roller blind element and/or the cleaning element is intended. By the sensor unit a registration and/or recognition of contamination is possible. The cleaning process of the roller blind element and/or the cleaning element can in this case only be induced in cases in which such a cleaning is necessary. Thereby, for example, during the application of a water cleaning a waste of cleaning liquid can be avoided. Also a use of a vibration cleaning only in cases if it's necessary represents an energy saving approach of a cleaning.

Moreover, it can be intended according to an embodiment of the roller blind module according to the invention that the drive is triggerable based on a measurement of at least one sensor unit. In this manner it is possible to achieve an additional protection of the cooling module. By the sensor unit the contamination in front of the roller blind element is detected. Thereby it can be recognized that a contamination and/or damage of the cooling module is immediately imminent. By a control of the drive based on the measurements of at least one sensor unit it is possible to control the roller blind module in front of the cooling module by entering dirt and to readjust the roller blind element particularly quickly in its at least one second position.

Thereby it is possible to provide an additional protection of contamination and/or damage of the cooling module.

According to a second aspect of the invention the object is solved by a front end module for a vehicle at least comprising a cross member, a cooling module that is assembled at the cross member and a roller blind module for the cooling module. Particularly the front end element according to the invention for a vehicle is characterized in that the roller blind module is assembled at the cooling module and that the roller blind module is coilable by a roller blind element at least a drive by which the roller blind element is coilable from its first position in at least a second position wherein in the first position the roller element is wound up in the second position the roller element is assembled according to the drive direction of the vehicle in front of the cooling module and comprises a cleaning device with at least one cleaning element wherein the roller blind element is cleanable by the cleaning element.

A front end element mainly forms the front of a vehicle. In such a front end element thereby often for example a cooling module and corresponding air guides are integrated. Moreover, the front end modules often comprise further functional components like for example elements of an impact protection system of a vehicle, a bumper with a bumper coat or lightening elements of the vehicle. Thereby mainly all components of a front end element are assembled and attached at a cross member of a front end module.

By a direct assembly of the roller blind element at the cooling module an improved control of the airstream can be achieved, which in driving direction of the vehicle streams in the cooling module from the front. Further, particularly by a small distance of the roller blind element from the cooling module an improved protection of the cooling module for contamination is achieved. The cooling module can thereby for example be protected by the roller blind element from dust, sand, split, water, mud, snow, ice and/or insects. This dirt is prevented from the cooling module from the roller blind element. Therefore it can be an advantage if the cleaning facility is intended with at least one cleaning element that is performed for cleaning the roller blind element. Thereby it can be ensured at any time that also the roller blind element is free or at least mainly free from contamination. Thereby a secure functionality of the roller blind element is ensured at any time. Thereby such a front end element at least regarding the roller blind element of the roller blind module is particularly low-maintenance.

According to a preferred embodiment of the front end element of a vehicle according to the invention it can be intended that the roller blind module is performed according to the first aspect of the invention. All advantages and details, which are described regarding a roller blind module for a cooling module of a vehicle according to the first aspect of the invention thereby also apply for a front end module of a vehicle which comprises such a roller blind module.

Further, it can be intended with a front module according to the invention that the cooling module comprises an intercooler and/or a climate condenser and/or a water cooler. In recent vehicles the cooling module can achieve different functions. Thereby the cooling module can be assembled from multiple cooling elements like for example an intercooler, a climate condenser or a water cooler. Also an integration of the different functionalities in a cooling element is possible. According to the invention it can be intended that each single cooling element is equipped with a particular roller blind element. Alternatively also a roller blind element for the whole cooling module is possible. In this manner it is possible to ensure vehicle dependent and specific a particular good safety of the cooling module by the roller blind module. For example it is possible that the cooling module comprises a climate condenser and a water cooler wherein optionally an intercooler can be intended in front of the climate condenser. The roller blind element can be uncoilable in front of the climate condenser between its respective positions. Alternatively it is also possible that the roller blind element can be wound up or rolled from between the climate condenser and the water cooler in its particular position.

BRIEF DESCRIPTION OF THE SEVERAL VIEWS OF THE DRAWINGS

Further advantages, features and details of the invention result from the subsequent description, in which embodiments of the invention are described in detail respective to the drawings. Thereby the features described in the claims and in the description can be each for themselves and also in any combination refer to all figures of the drawings. It is each schematically shown:

Elements with the same functionality are provided in the single figures with the same references.

DESCRIPTION OF SPECIFIC EMBODIMENTS OF THE INVENTION

Figure 1:
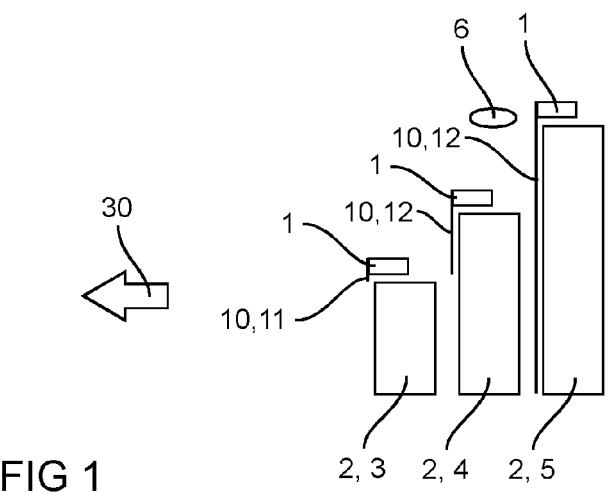
FIG. 1 a possible cooling module with a roller blind module according to the invention, FIG. 2 a partial view of a roller blind module according to the invention, FIG. 3 a further partial detail view of the roller blind module according to the invention, FIG. 4 a cross section through parts of the roller blind module according to the invention.

FIG. 1 schematically shows a cooling module 2 of a vehicle. The cooling module 2 comprises in this case an intercooler 3, a climate condenser 4 and a water cooler 5. Each single part of the cooling module 2 is equipped with an own roller module 1. Each of the roller module 1 is assembled above a part of the cooling module 2 and performed for a vertical turning movement. The roller blind element 10 of the single roller blind module 1 is thereby arranged in different positions 11, 12. So the roller blind element 10 that is assembled at the intercooler 2, 3 is in its first position 11. The roller blind element 10 is completely wound up and the intercooler 2, 3 is completely exposed to the air flow. The air flow is thereby mainly opposing the driving direction, which is indicated by the arrow 30. The roller blind element 10 of the roller blind module 1 of the climate condenser 2, 4 and the water cooler 2, 5 are each arranged in a second position 12. Thereby the second position 12 of the roller blind element 10 of the climate condenser 2, 4 is performed in a way that the roller blind element 10 covers the climate condenser 2, 4 to approximately one third. In contrast thereto the second position 12 of the roller blind element 10 of the water cooler 2, 5 is shaped in a way that the roller blind element 10 completely covers the water cooler 2, 5. Naturally, for all roller blind elements 10 of a roller blind module 1 different second positions 12 are possible, in which single parts of the cooling module 2 can be as needed partially or completely be covered. Moreover, a sensor unit 6 is shown. By this sensor unit 6 dirt can be detected in front of or on the roller blind element 10. Thereby it is possible to activate a cleaning of the roller blind element 10 as needed. Further, it is possible to detect dirt already in front of the roller blind element 10 of a roller blind module. In case a roller blind module 10 is in its first position 11, it is possible to transfer the roller blind element in a second position 12 by an increase of the drive 5 (not shown) in which the cooling module 2 is assembled at the roller blind module 1 and is protected from the approaching dirt.

The cooling module 2 according to FIG. 1 can comprise only one of the climate condenser 4 and the water cooler 5 wherein the intercooler 2 is assembled at a position at the motor vehicle. Advantageously the roller blind element 10 is assembled in front of the climate condenser 4 or between the climate condenser 4 and the water cooler 5.

Figure 2:
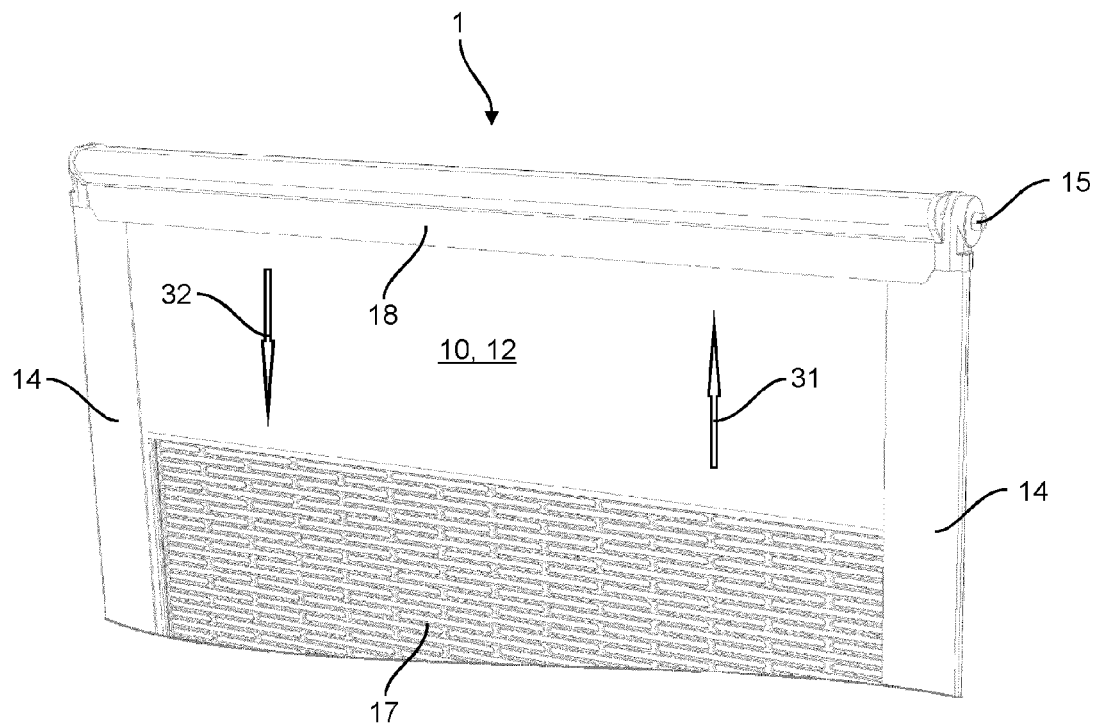

In FIG. 2 a possible embodiment of a roller blind module 1 is schematically shown. This roller blind module 10 is arranged in its second position 12, in which it partially covers a cooling module 2 (not shown). The rest of the roller blind element 10 is wound up on a wrap-around roller 22 (not visible), which is arranged behind a cover 18. This wrap-around roller is driven by a drive 15 whereby the roller blind element 10 can be moved in a coiling direction 31 and an uncoiling direction 32. Laterally the roller blind element 10 is guided in guidance elements 14 whereby a flutter of the roller blind element in the air flow or a tilting of the roller blind element 10 during a movement in the coiling direction 31 or uncoiling direction 32 is avoided.

The roller blind element 10 is further stabilized by a support element 17. This has the advantage, particularly with high speed, that the roller blind element is not pressed out of the guidance element 14 by the up streaming air. A particularly weight saving embodiment of the roller blind element 10 is thereby also possible since the stability of the roller blind element 10 is not only ensured by the material of the roller blind element 10. In operation dirt particles can accumulate on the roller blind element 10. According to the invention it is thereby intended that a cleaning device 20 is intended, here covered by the cover 18 with which the roller blind element 10 can be cleaned. A functionality of the roller blind element 10 can thereby be ensured at any time.

Figure 3:
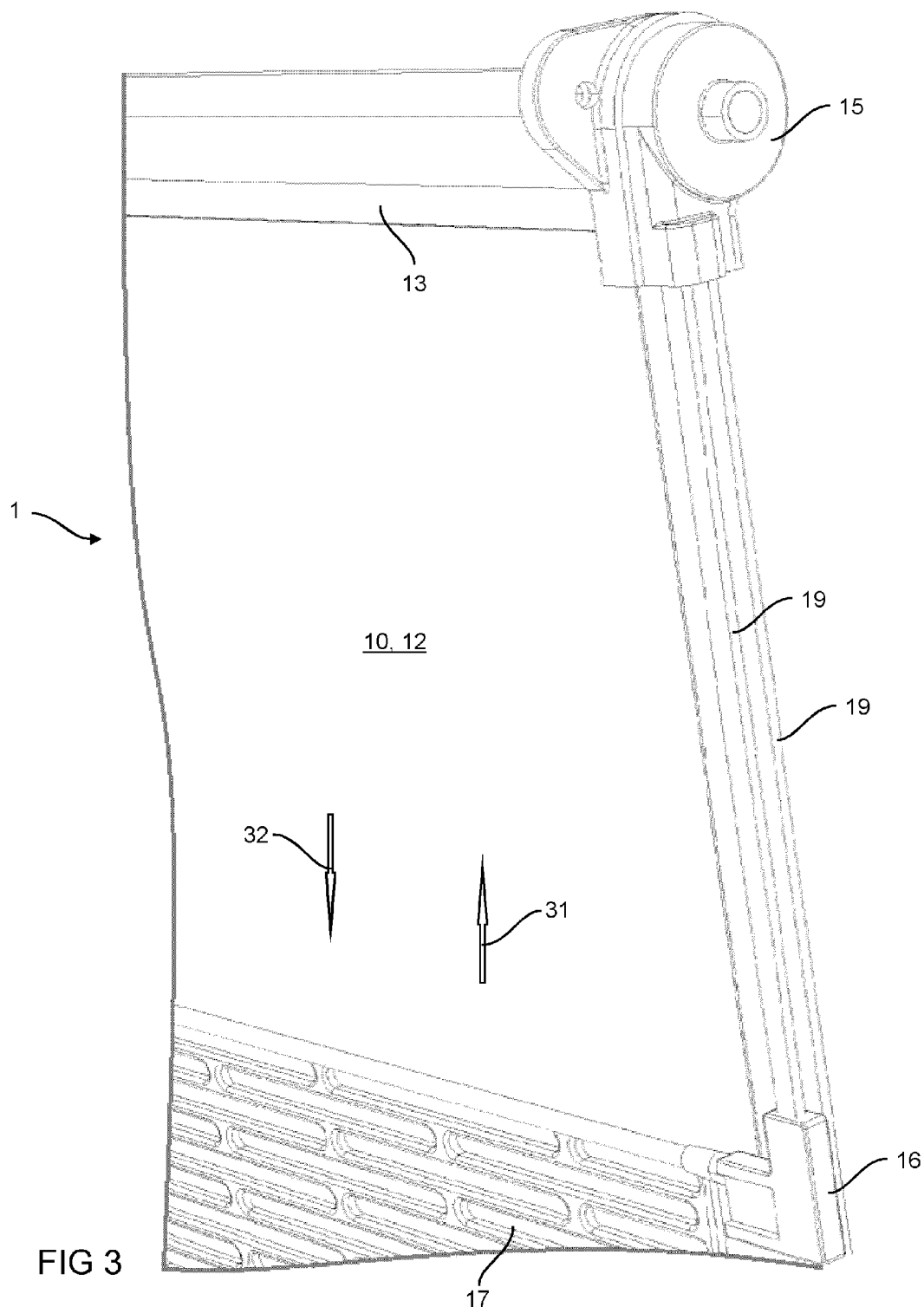

In FIG. 3 a further partial view of a roller blind module 1 according to the invention is shown. In this partial view the guidance element 14 and the cover 18 are removed. FIG. 3 shows the orientation of the rolling direction 31, 32 of the roller blind element 10 when it is in its second position 12. The roller blind element 10 is thereby in turn supported by a support element 17. Further also the drive belts 19 of the drive 15, which are covered by the guidance element 14 in FIG. 2 are visible. At the drive belt 19 a clamping element 16 is intended by which the roller blind element 10 is connected with the drive belt 19. The drive 15 thereby actuates on the one hand the wrap-around roller 22 (not visible) of the roller blind element 10 and also the movement of the lower edge of the roller blind element 10 via the clamping element 16. A secure movement of the roller blind element 10 in its coiling direction 31 and also in its uncoiling direction 32 can thereby be ensured at any time. Extensive drive constructions, for example via tieback, can thereby be avoided.

Figure 4:
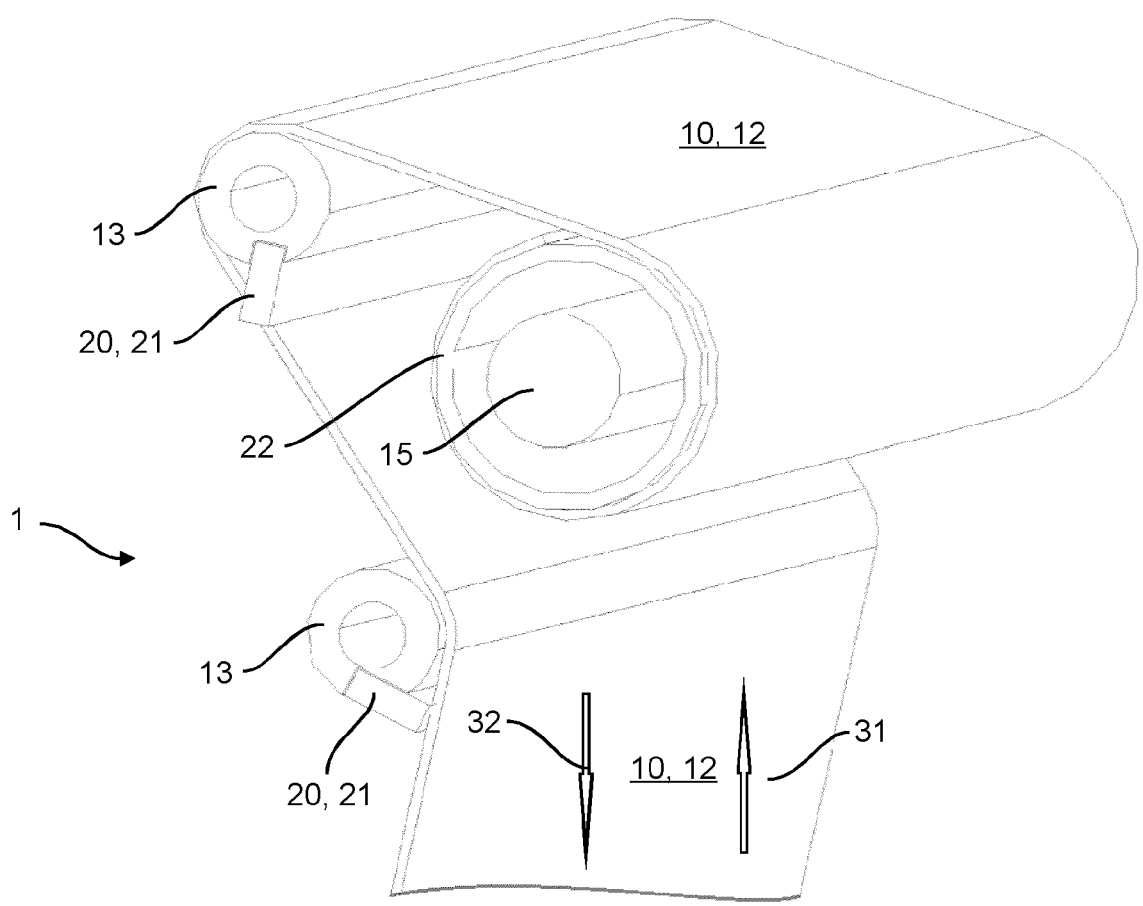

FIG. 4 shows a possible internal composition of a part of a roller blind module 1 according to the invention. Shown is thereby particularly a wrap-around roller 22, which is driven by a drive 15. At this wrap-around roller 22 the roller blind element 10 is wound up. Here only a part of the roller blind element 10 is wound up since it is in its second position 12, in which a bigger part of the roller blind element 10 is rolled from the wrap-around roller 22. The roller blind element 10 is thereby guided in its embodiment of a roller blind module 1 according to the invention via two deflection rollers 13. Both deflection rollers 13 are in this case equipped with a cleaning element 21 of a cleaning device 20. Both deflection rollers 13 are hereby pivotably mounted between two stops (not visible) in a way that in the coiling direction 31 the cleaning elements 21 of the cleaning device 20 rest at the roller blind element 10. The cleaning elements 21 are thereby performed as deflector elements. By a movement of the roller blind element 10 in uncoiling direction 32 the deflection rollers turn up to another stop whereby the cleaning elements 21 are turned away from the roller blind element 10. An uncoiling of the roller blind element 10 in uncoiling direction 32 can thereby occur without cleaning. This has the advantage that on the one hand the contamination, which is assembled at the roller blind element 10 in its second position is stripped-off during a movement of the roller blind element 10 in coiling direction 31 wherein a coiling of the roller blind element 10 to the wraparound roller 22 ensures at any time a clean uncontaminated state of the roller blind element 10. On the other hand, an uncoiling of the roller blind element 10 in uncoiling direction 32 is not hindered by cleaning elements 21 of the cleaning device 20 at the deflection roller 13. This ensures a particular energy saving uncoiling process. The cleaning elements 21 of the cleaning device 20 are performed as stripper elements. Naturally, it can also be intended that one or both deflection rollers are intended for performing vibrations wherein again contamination can be removed from the roller blind element 10. Also a use of a water purification device is possible. It is hereby not shown that it can be also intended that by a cleaning device the cleaning element is additionally cleaned itself. Thereby it can be ensured that no contamination is retransferred to the roller blind element by a contaminated cleaning element 21. Also during a cleaning of the cleaning element 21 multiple possibilities are possible like for example liquid cleaning or vibration cleaning.

The previous description of the embodiments describes the present invention only in the scope of examples. Naturally single features of the embodiments as technically meaningful can be freely combined to one another without leaving the scope of the present invention.

REFERENCE LIST

1 Roller blind module
2 Cooling module
3 Intercooler
4 Climate condenser
5 Water cooler
6 Sensor unit
10 Roller blind element
11 First position
12 Second position
13 Deflection roller
14 Guidance element
15 Drive
16 Clamping element
17 Support element
18 Cover
19 Drive belt
20 Cleaning device
21 Cleaning element
22 Wrap-around roller
30 Driving direction
31 Coiling direction
32 Uncoiling direction

The invention claimed is:

1. A roller blind module (1) for a cooling module (2) of a vehicle wherein the roller blind module (1) is positioned at the cooling module(2), the roller blind module comprising: blind element (10), at least a drive (15), by which the roller blind element (10) is uncoilable in a first rolling direction from a first position (11) to at least one second position (12) and coilable in a second rolling direction, wherein in the first position (11) the roller blind element (10) is wound up and in the at least one second position (12) the roller blind element (10) is positioned in front of the cooling module (2) with respect to a driving direction (30) of the vehicle; and a cleaning device (20) with at least one cleaning element (21) wherein the roller blind element (10) is cleanable by the cleaning element (21), wherein the roller blind element (10) is deflected by at least one deflection roller, wherein the at least one cleaning element (21) is positioned on the at least one deflection roller (13) and when the at least one deflection roller (13) rotates the cleaning element (21) is movable between a cleaning position and a disengaged position; the cleaning element being configured to clean the roller blind element (10) when the roller blind element (10) moves in one of the rolling directions of the roller blind element (10) and the cleaning element is in the cleaning position; wherein the at least one deflection roller (13) is pivotably mounted such that when the roller blind element (10) is uncoiling from the first position (11) to the at least one second position (12) the at least one deflection roller (13) rotates such that the cleaning element (21) moves from the cleaning position to the disengaged position.

2. The roller blind module (1) according to claim 1, wherein a support element (17) is provided, which supports the roller blind element (10) in the at least one second position (12).

3. The roller blind module (1) according to claim 1, wherein at least a guidance element (14) is provided, by which the roller blind element (10) is guided during the uncoiling from the first position (11) to the at least one second position (12).

4. The roller blind module (1) according to claim 1, wherein the drive (15) is a belt drive (15).

5. The roller blind module (1) according to claim 4, wherein the roller blind element (10) is connected to the belt drive (14) by at least a clamping element (16).

6. The roller blind module (1) according to claim 1, wherein the roller blind element (10)) comprises a dirt repellent surface.

7. The roller blind module (1) according to claim 1, wherein the cleaning element (21) comprises a bristle element.

8. The roller blind module (1) according to claim 1, wherein the cleaning element (21) comprises a device for cleaning the roller blind element (10) with a liquid.

9. The roller blind module (1) according to claim 1, wherein the cleaning element (21) comprises a device for cleaning the roller blind element (10) by vibration.

10. The roller blind module (1) according to claim 1, wherein the cleaning device (20) is configured for cleaning the cleaning element (21).

11. The roller blind module (1) according to claim 1, wherein the roller blind element (10) is tensible by the at least one deflection roller (13).

12. The roller blind module (1) according to claim 1, wherein the turning of the at least one deflection roller (13) is restricted by at least a stop, or the rolling direction in which the roller blind element (10) is cleanable is the second rolling direction (31).

13. The roller blind module (1) according to claim 1, wherein at least one sensor unit (6) is provided for recognizing contaminations in front of the roller blind element (10) or on the roller blind element (10) or on the cleaning element (21).

14. The roller blind module (1) according to claim 13, wherein the drive (15) is triggerable based on measurements of the at least one sensor unit (6).

15. A front end element for a vehicle at least comprising a cross member, a cooling module (2) that is positioned at the cross member and a roller blind module (1) for the cooling module (2), wherein the roller blind module (1) is positioned at the cooling module (2) and that the roller blind module (1) comprises: a roller blind element (10), at least a drive (15), through which the roller blind element (10) is uncoilable in a first rolling direction from a first position (11) to at least one second position (12) and coilable in a second rolling direction, wherein in the first position (11) the roller blind element (10) is wound up and in the at least one second position (12) the roller blind element (10) is positioned in front of the cooling module(2) with respect to a driving (30) of the vechicle; and a cleaning device (20) with at least one cleaning element (21) wherein the roller blind element (10) is cleanable by the cleaning element (21); wherein at the roller blind element (10) is deflected by at least one deflection roller, wherein the at least one cleaning element (21) is positioned at the at least one deflection roller (13) and when the at least one deflection roller (13) rotates the cleaning element (21) is movable between a cleaning position and a disengaged position; the cleaning element being configured to clean the roller blind element (10) when the roller blind element (10) moves in one of the rolling directions of the roller blind element (10) and the cleaning element is in the cleaning position;

wherein the at least one deflection roller (13) is pivotably mounted such that when the roller blind element (10) is uncoilable from the first position (11) to the at least one second position (12) the at least one deflection roller

(13) rotates such that the cleaning element (21) moves from the cleaning position to the disengaged position.

16. The front end element according to claim 15, wherein a support element (17) is provided, which supports the roller blind element (10) in at least a second position (12).

17. The front end element according to claim 15, wherein the cooling module (2) comprises an intercooler (3), a climate condenser (4), and a water cooler (5).

18. The front end element according to claim 17, wherein the roller blind element (10) is positioned in front of the climate condenser (4) or between the climate condenser (4) and the water cooler (5).

19. The roller blind module (1) according to claim 10, wherein the cleaning is performed by at least one of a liquid or vibration.

20. The roller blind module (1) according to claim 1, wherein at least one optical sensor unit (6) is provided for recognizing contaminations in front of the roller blind element (10) or on the roller blind element (10) or on the cleaning element (21).

\* \* \* \* \*